United States Patent
Corcoran et al.

(10) Patent No.: US 10,415,414 B2
(45) Date of Patent: Sep. 17, 2019

(54) SEAL ARC SEGMENT WITH ANTI-ROTATION FEATURE

(71) Applicant: United Technologies Corporation, Farmington, CT (US)

(72) Inventors: Christopher Corcoran, Manchester, CT (US); Michael G. McCaffrey, Windsor, CT (US); Benjamin F. Hagan, Winston-Salem, NC (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 804 days.

(21) Appl. No.: 15/071,306

(22) Filed: Mar. 16, 2016

(65) Prior Publication Data

US 2017/0268365 A1    Sep. 21, 2017

(51) Int. Cl.
| | |
|---|---|
| *F01D 11/08* | (2006.01) |
| *F01D 5/28* | (2006.01) |
| *F01D 9/04* | (2006.01) |
| *F01D 11/12* | (2006.01) |
| *F01D 25/24* | (2006.01) |

(52) U.S. Cl.
CPC .............. *F01D 11/08* (2013.01); *F01D 5/284* (2013.01); *F01D 9/04* (2013.01); *F01D 11/12* (2013.01); *F01D 11/122* (2013.01); *F01D 25/246* (2013.01); *F05D 2230/60* (2013.01); *F05D 2240/11* (2013.01); *F05D 2240/12* (2013.01); *F05D 2240/30* (2013.01); *F05D 2260/30* (2013.01); *Y02T 50/672* (2013.01)

(58) Field of Classification Search
None
See application file for complete search history.

(56) References Cited

U.S. PATENT DOCUMENTS

| | | | |
|---|---|---|---|
| 4,087,199 A | 5/1978 | Hemsworth et al. | |
| 4,527,385 A | 7/1985 | Jumelle et al. | |
| 4,728,257 A | 3/1988 | Handschuh | |
| 4,856,963 A * | 8/1989 | Klapproth | F01D 9/042 |
| | | | 415/190 |
| 5,609,469 A | 3/1997 | Worley et al. | |
| 5,639,210 A | 6/1997 | Carpenter et al. | |
| 6,142,731 A | 11/2000 | Dewis et al. | |
| 6,431,825 B1 | 8/2002 | McLean | |

(Continued)

FOREIGN PATENT DOCUMENTS

| | | |
|---|---|---|
| EP | 2613015 | 7/2013 |
| WO | 2015038906 | 3/2015 |

(Continued)

OTHER PUBLICATIONS

The Extended European Search Report for EP Application No. 17160058.8, dated Jul. 19, 2017.

*Primary Examiner* — Kayla Mccaffrey
(74) *Attorney, Agent, or Firm* — Carlson, Gaskey & Olds, P.C.

(57) ABSTRACT

A seal arc segment includes a body including a radially inner surface and a radially outer surface. The radially inner surface and the radially outer surface are located between a first circumferential end and a second circumferential end. A recessed portion defines a cavity in the radially outer surface. A notch is located in an edge of the recessed portion adjacent the first circumferential end.

19 Claims, 3 Drawing Sheets

(56) References Cited

U.S. PATENT DOCUMENTS

| | | | |
|---|---|---|---|
| 6,726,448 B2 | 4/2004 | McGrath et al. | |
| 6,733,235 B2 | 5/2004 | Alford et al. | |
| 7,052,235 B2 | 5/2006 | Alford et al. | |
| 7,163,206 B2 | 1/2007 | Cross et al. | |
| 7,435,049 B2 | 10/2008 | Ghasripoor et al. | |
| 7,527,472 B2 | 5/2009 | Allen | |
| 7,959,407 B2* | 6/2011 | Tholen | B22C 9/04 415/115 |
| 8,123,466 B2 | 2/2012 | Pietraszkiewicz et al. | |
| 8,303,247 B2 | 11/2012 | Schlichting et al. | |
| 8,439,636 B1 | 5/2013 | Liang | |
| 8,534,995 B2 | 9/2013 | McCaffrey | |
| 8,568,091 B2 | 10/2013 | McCaffrey | |
| 8,585,357 B2 | 11/2013 | DiPaola et al. | |
| 8,596,963 B1 | 12/2013 | Liang | |
| 8,790,067 B2 | 7/2014 | McCaffrey et al. | |
| 8,876,458 B2 | 11/2014 | Thibodeau et al. | |
| 8,920,127 B2 | 12/2014 | McCaffrey | |
| 8,944,756 B2 | 2/2015 | Lagueux | |
| 9,039,358 B2 | 5/2015 | Tholen et al. | |
| 9,115,596 B2 | 8/2015 | Clouse | |
| 9,169,739 B2 | 10/2015 | Mironets et al. | |
| 9,200,530 B2 | 12/2015 | McCaffrey | |
| 9,228,447 B2 | 1/2016 | McCaffrey | |
| 2004/0047725 A1* | 3/2004 | Tomita | F01D 11/005 415/116 |
| 2006/0038358 A1 | 2/2006 | James | |
| 2007/0122270 A1* | 5/2007 | Brueckner | F01D 9/042 415/191 |
| 2008/0211192 A1 | 9/2008 | Pietraszkiewicz et al. | |
| 2009/0096174 A1 | 4/2009 | Spangler et al. | |
| 2009/0169368 A1 | 7/2009 | Schlichting et al. | |
| 2009/0208322 A1 | 8/2009 | McCaffrey | |
| 2010/0226760 A1 | 9/2010 | McCaffrey | |
| 2011/0044803 A1 | 2/2011 | Di Paola et al. | |
| 2011/0044804 A1 | 2/2011 | DiPaola et al. | |
| 2011/0243725 A1* | 10/2011 | Jones | F01D 9/04 415/209.3 |
| 2012/0195743 A1 | 8/2012 | Walunj et al. | |
| 2012/0275898 A1 | 11/2012 | McCaffrey et al. | |
| 2013/0017057 A1 | 1/2013 | Lagueux | |
| 2013/0022469 A1 | 1/2013 | McCaffrey | |
| 2013/0113168 A1 | 5/2013 | Lutjen et al. | |
| 2013/0209240 A1 | 8/2013 | McCaffrey | |
| 2014/0016761 A1 | 1/2014 | Werner | |
| 2014/0017072 A1 | 1/2014 | McCaffrey | |
| 2014/0023480 A1 | 1/2014 | McCaffrey | |
| 2014/0033149 A1 | 1/2014 | Groves et al. | |
| 2014/0044528 A1 | 2/2014 | Clouse | |
| 2014/0053040 A1 | 2/2014 | Hargan | |
| 2014/0127006 A1 | 5/2014 | Romanov et al. | |
| 2014/0133955 A1 | 5/2014 | McCaffrey et al. | |
| 2014/0186152 A1 | 7/2014 | McCaffrey et al. | |
| 2015/0016954 A1 | 1/2015 | Thibodeau et al. | |
| 2015/0031764 A1 | 1/2015 | Kraus et al. | |
| 2015/0226132 A1 | 8/2015 | Roy Thill et al. | |
| 2015/0337672 A1 | 11/2015 | McCaffrey et al. | |
| 2015/0369076 A1 | 12/2015 | McCaffrey et al. | |
| 2016/0003078 A1 | 1/2016 | Stevens et al. | |
| 2016/0003080 A1 | 1/2016 | Mcgarrah | |

FOREIGN PATENT DOCUMENTS

| | | |
|---|---|---|
| WO | 2015047478 | 4/2015 |
| WO | 2015061108 | 4/2015 |
| WO | 2015088656 | 6/2015 |
| WO | 2015109292 | 7/2015 |
| WO | 2015112354 | 7/2015 |

* cited by examiner

SEAL ARC SEGMENT WITH ANTI-ROTATION FEATURE

BACKGROUND

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments, such as blade outer air seals, that are circumferentially arranged around each stage of rotor blades. The arc segments may be abradable to reduce the radial gap with the tips of the blades to further reduce the gap between the blades and plurality of arc segments.

SUMMARY

In one exemplary embodiment, a seal arc segment includes a body including a radially inner surface and a radially outer surface. The radially inner surface and the radially outer surface are located between a first circumferential end and a second circumferential end. A recessed portion defines a cavity in the radially outer surface. A notch is located in an edge of the recessed portion adjacent the first circumferential end.

In a further embodiment of the above, a first retention member is adjacent the first circumferential end of the seal arc segment for engaging a mounting structure. A first recessed portion is located radially inward from the first retention member.

In a further embodiment of any of the above, the first recessed portion and the notch are formed by a machining process. The seal arc segment comprises a ceramic material.

In a further embodiment of any of the above, the first recessed portion includes a curved surface that extends between axial ends of the body.

In a further embodiment of any of the above, a second retention member is adjacent the second circumferential end of the seal arc segment for engaging the mounting structure. A curved surface extends between axial ends of the body.

In a further embodiment of any of the above, the radially outer surface defines perimeter of the recessed portion.

In a further embodiment of any of the above, the notch includes a first circumferential end wall for engaging a mating component to prevent circumferential rotation of the body. The first circumferential wall includes a flat surface.

In another exemplary embodiment, a gas turbine engine includes a rotor section that includes a rotor that has a plurality of blades and at least one annular seal assembly that circumscribes the roto. The annular seal assembly includes at least one seal arc segment including a body that has a radially inner surface and a radially outer surface. The radially inner surface and the radially outer surface are located between a first circumferential end and a second circumferential end. A recessed portion defines a cavity in the radially outer surface. A notch is located in an edge of the recessed portion adjacent the first circumferential end. A mating component engages the notch and an engine static structure.

In a further embodiment of any of the above, a first retention member is adjacent the first circumferential end of the seal arc segment for engaging a mounting structure. A first recessed portion is located radially inward from the first retention member.

In a further embodiment of any of the above, the first recessed portion and the notch are formed by a machining process.

In a further embodiment of any of the above, the seal arc segment comprises a ceramic material and the mating component comprises a metallic material.

In a further embodiment of any of the above, the first recessed portion includes a curved surface that extends between axial ends of the body.

In a further embodiment of any of the above, the mating component includes a tab that extends in a radial direction and an axial direction for engaging a recess in the engine static structure.

In a further embodiment of any of the above, the mating component includes a circumferentially extending portion that has a first circumferential end for engaging the notch and a second circumferential end engaging a portion of the body.

In a further embodiment of any of the above, the notch includes a first circumferential end wall for engaging a mating component to prevent circumferential rotation of the body relative to the engine static structure.

In a further embodiment of any of the above, the first circumferential end of the mating component includes one of a crowned surface or a flat surface. The first circumferential wall of the notch includes the other of the crowned surface or the flat surface.

In a further embodiment of any of the above, the first circumferential end of the mating component includes a crowned surface. The first circumferential wall of the notch includes one of a flat surface or a recessed surface for engaging the crowned surface.

In another exemplary embodiment, a method for maintaining positioning of a seal assembly includes locating a mating component in a recessed portion on a radially outer side of the seal arc segment. The seal arc segment is mounted to a mounting structure. A notch adjacent the recessed portion in the seal arc segment is engaged with a first circumferential end of the mating component. At least one of a recess or a radially extending projection in an engine static structure is engaged with the other of the recess or the radially extending projection on the mating component.

In a further embodiment of any of the above, circumferential movement of the seal arc segment is restricted while the mating component engages the engine static structure and the seal arc segment.

In a further embodiment of any of the above, the seal arc segment includes a first retention member and a first recessed portion adjacent the first retention member. The first recessed portion and the notch are formed in the seal arc segment by a machining process.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
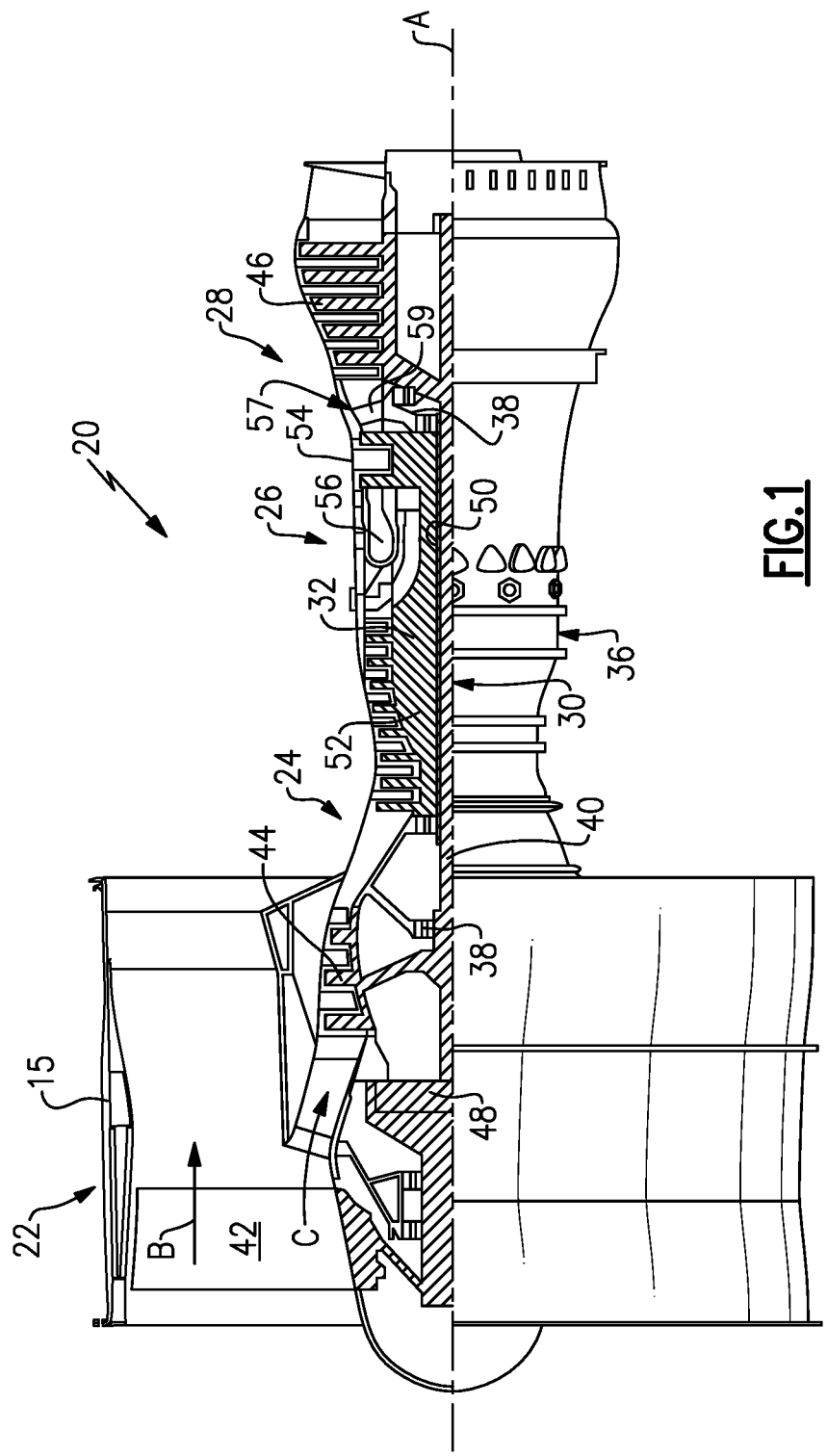
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2:
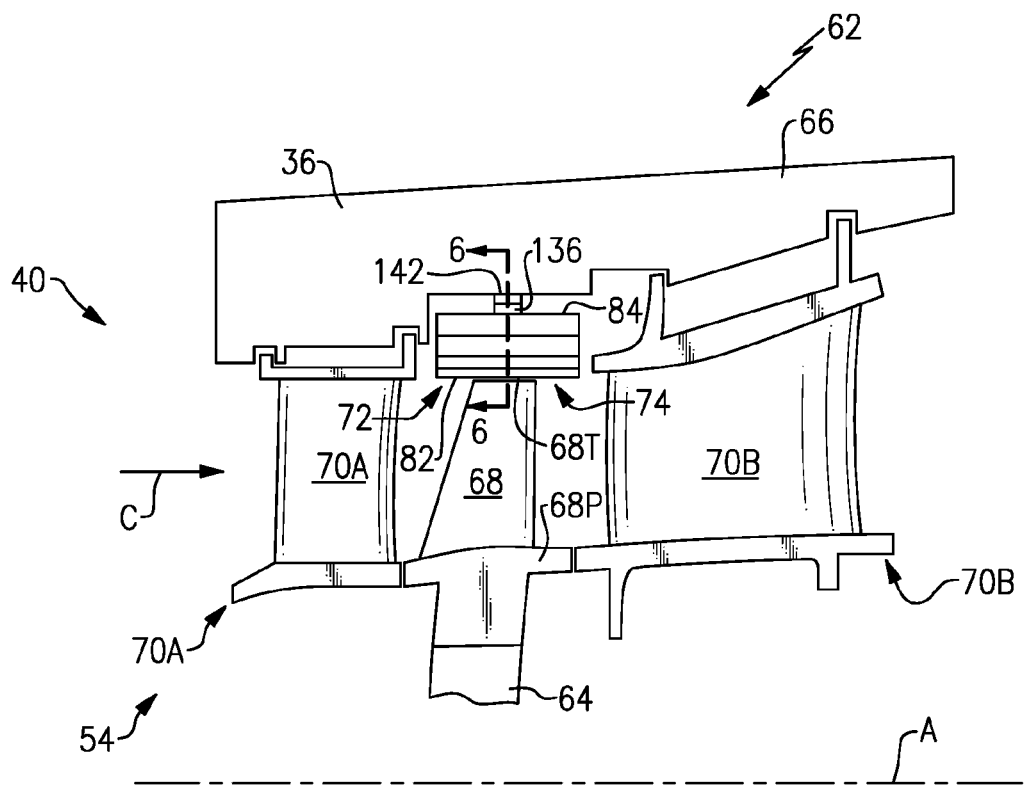
FIG. 2 illustrates a portion of the gas turbine engine of FIG. 1.

FIG. 2 illustrates a portion 62 of a gas turbine engine, such as the gas turbine engine 20 of FIG. 1. In the illustrated embodiment, the portion 62 is representative of the high pressure turbine 54. However, it should be appreciated that other portions of the gas turbine engine 20 could benefit from the teachings of this disclosure, including but not limited to, the compressor section 24, and the low pressure turbine 46.

In one exemplary embodiment, a rotor disk 64 (only one shown, although multiple disks could be disposed within the portion 62) is mounted for rotation about the engine centerline longitudinal axis A relative to an engine case 66 of the engine static structure 36. The portion 62 includes an array of rotating blades 68 (mounted to the rotor disk 64) and a first array of vanes 70A located axially forward of the blades 68 and a second array of vanes 70B located axially aft of the blades 68. Additional arrays of blades 68 could be located forward of the first array of vanes 70A or aft of the second array of vanes 70B. In this disclosure, axial or axially is in relation not the engine axis A of the gas turbine engine 20 unless stated otherwise.

The first and second array of vanes 70A, 70B are fixed relative to the engine case 66 such that the first and second array of vanes 70A, 70B do not rotate about the axis A. In the illustrated embodiment, the first and second array of vanes 70A, 70B are fixed such that they do not rotate about an axis through each respective vane 70A, 70B. In another non-limiting embodiment, the first and second array of vanes 70A, 70B could be variable vanes and rotate about an axis extending through a length of a respective vane 70A, 70B that is transverse or perpendicular to the axis A to modulate flow through the core flow path C.

Each blade 68 attached to the rotor disk 64 extends from a blade platform 68P to a blade tip 68T at a radially outermost portion of the blades 68. In this disclosure, radial or radially is in relation to the engine axis A unless stated otherwise. The blade tip 68T is a free end that is unsupported by additional structure. The blade tip 68T extends toward a seal arc segment, such as a blade outer air seal (BOAS) 72 (shown schematically in FIG. 2). For example, a plurality of BOAS 72 may be circumferentially positioned relative to one another to provide a seal assembly, such as a segmented BOAS assembly 74. The BOAS assembly 74 generally surrounds the rotor disk 64 and the blades 68 carried by the rotor disk 64. The BOAS assembly 74 seeks to reduce the amount of fluid that passes over the blade tip 68T of the blade 68 in order to increase the efficiency of the gas turbine engine 20 while minimizing or reducing any contact between the blade tips 68T and the BOAS assembly 74. The BOAS assembly 74 and the blade platform 68P directs the core flow path C past the blades 68.

Figure 3:
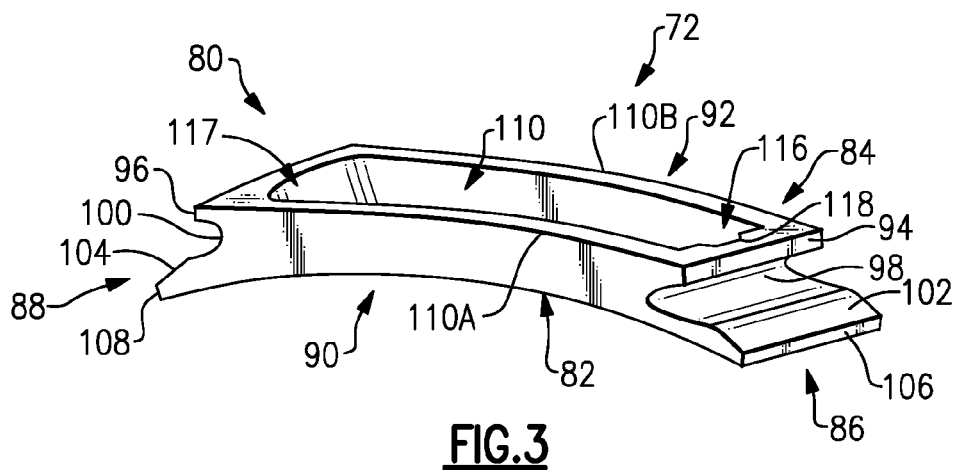
FIG. 3 illustrates a perspective view of a blade outer air seal.

FIG. 3, with continued reference to FIG. 2, illustrates the BOAS 72 that may be incorporated into a gas turbine engine 20, such as the portion 62 of FIG. 2. The BOAS 72 may include a ceramic body 80 having a radially inner surface 82 and a radially outer surface 84. When the BOAS 72 is installed in the gas turbine engine 20, the radially inner surface 82 faces toward the blade tip 68T and the radially outer surface 84 faces toward the engine case 66 (see FIG. 2). The radially inner surface 82 includes a curvature that follows a path of rotation of the blade tip 68T. The radially inner surface 82 and the radially outer surface 84 extend circumferentially between a first circumferential end 86 and a second circumferential end 88 and axially between a leading edge 90 and a trailing edge 92. The core flow path C travels along the radially inner surface 82.

The BOAS 72 includes a first retention feature 94 that extends from the radially outer surface 84 toward to first circumferential end 86 and a second retention feature 96 that extends from the radially outer surface 84 toward the second circumferential end 88. In one embodiment, the ceramic body 80 and the first retention feature 94 form a unitary structure (i.e., a monolithic structure) manufactured of a ceramic, ceramic matrix composite, or other suitable ceramic material. The first and second retention features 94, 96 may be utilized to mount the BOAS 72 relative to the engine case 66.

A first and second curved recess 98, 100 are located radially inward from the first and second retention features 94, 96, respectively. The first and second curved recess 98, 100 also contribute to the formation of the first and second retention features 94, 96 by removing material radially inward from the first and second retention features 94, 96. A first slanted surface 102 and a second slanted surface 104 extend circumferentially outward from a radially inner portion of the first and second curved recess 98, 100 to a first circumferential end and a second circumferential end 106, 108, respectively, of the BOAS 72. In the illustrated example, the first and second circumferential ends 106, 108 are located circumferentially outward from the first and second retention features 94, 96.

Figure 4:
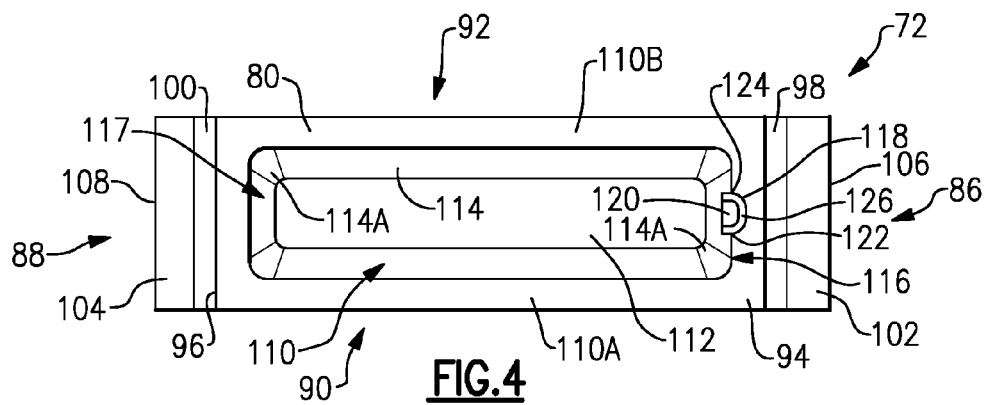
FIG. 4 illustrates a top view of the blade outer air seal of FIG. 3.

The radially outer surface 84 includes a pocket, such as a recessed portion 110, forming a cavity into the radially outer surface 84. The radially outer surface 84 also forms a perimeter around the recessed portion 110 and the recessed portion 110 extends into the ceramic body 80 a distance greater than half of the distance between the radially outer surface 84 and the radially inner surface 82. As shown in FIGS. 3 and 4, the radially outer surface 84 completely circumscribes the recessed portion 110. In another embodiment, the radially outer surface 84 only partially circumscribes the recessed portion 110 such that the radially outer surface 84 includes a discontinuity. The discontinuity may be in a forward wall portion 110A or an aft wall portion 110B.

Figure 6:
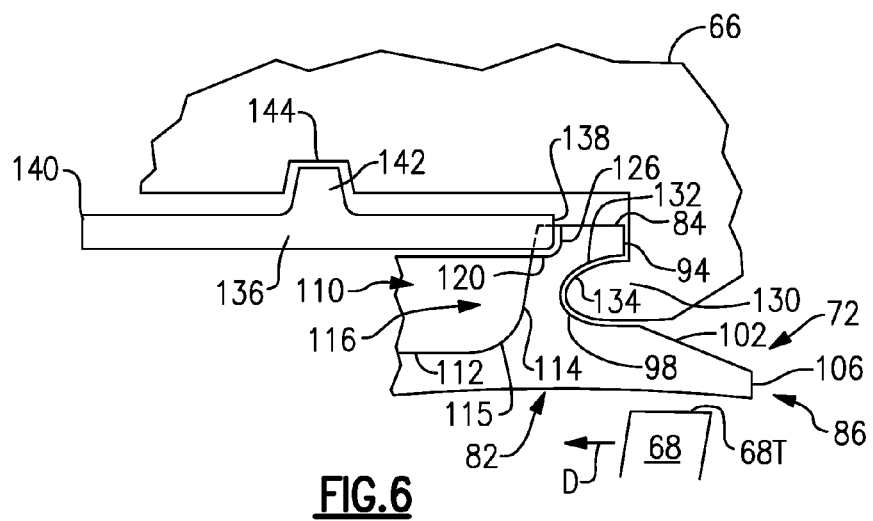
FIG. 6 illustrate a cross-sectional view taken along line 6-6 of FIG. 2.

The recessed portion 110 includes a bottom surface 112 connected to the radially outer surface 84 by a transition surface 114. In one embodiment, the transition surface 114 includes a slanted surface between the bottom surface 112 and the radially outer surface 84 with corner portions 114A having a radius of curvature. In another embodiment, a fillet 115 is located between the transition surface 114 and the bottom surface 112 as shown in FIG. 6.

The recessed portion 110 includes a first circumferential end 116 and a second opposite circumferential end 117. The first circumferential end 116 of the recessed portion 110 includes a notch 118. The first circumferential end 116 is adjacent the first circumferential end 86 of the BOAS 72. The notch 118 is located in a low stress region of the BOAS 72 to prevent damage to the structure of the BOAS 72 that could result from removing material in a high stress region of the BOAS 72.

Figure 5:
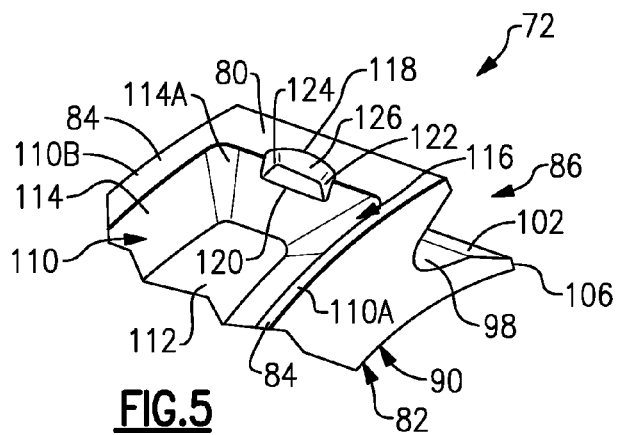
FIG. 5 illustrates a partial perspective view of the blade outer air seal of FIG. 3.

As shown in FIGS. 4-5, the notch 118 includes a bottom wall 120 partially surrounded by a forward wall 122 and an aft wall 124 that are connected to each other by a circumferential end wall 126. The intersection of the bottom wall 120 with the forward wall 122, the aft wall 124, and the circumferential end wall 126 could include a fillet or a sharp transition between the walls. The notch 118 removes a portion of the radially outer surface 84 while still allowing the radially outer surface 84 to surround the first circumferential end 116.

In one embodiment, the circumferential end wall 126 includes a flat surface in a mid-portion between the forward and aft walls 122, 124 such that the flat surface includes an infinite radius of curvature. The forward and aft walls 122 and 124 each intersect the circumferential end wall 126 and form an intersection with a fillet having a radius of curvature or an intersection with a sharp or line transition.

During manufacturing of the BOAS 72, the ceramic body 80 is cast to form several of the features on BOAS 72, such as the general shape and the recessed portion 110. However, several features of the BOAS 72 require a greater level of precision in the tolerances that cannot be maintained simply by casting and curing the ceramic body 80.

In order to maintain higher tolerances in the ceramic body 80, the additional features must be machined into the ceramic body 80 after the ceramic body 80 is cured and/or exposed to elevated temperatures for an extended period of time. The curing process may result in dimensional variations in the ceramic body between the green or bisque state and the final cured state. The notch 118, the radially inner surface 82, and the first and second curved recesses 98, 100 are examples of features that may be formed by a machining process, such as milling, after the ceramic body 80 is cured. The tolerances between the notch 118, the first curved recess 98, and the radially inner surface 82 are closely controlled to reduce contact with the blade tip 68T and undesired circumferential movement of the BOAS 72 as further described below.

As shown in FIG. 6, a portion of the engine case 66 or an intermediate portion of the engine static structure 36 includes a first retention member 130 on a carriage or a mounting structure that interfaces with the first retention feature 94 and the first curved recess 98 to secure the BOAS 72 relative to the engine case 66. The carriage or mounting structure may be a separate element from the engine case 66 and connected to the engine case 66 through one or more mechanical connections. Although only the first retention member 130 is shown engaging the first retention feature 94 and the first curved recess 98, a second retention member (not shown) will engage the second retention feature 96 and the second curved recess 100 in a similar manner.

During operation of the gas turbine engine 20, the blades 68 rotate in the direction D as shown in FIG. 6. As the blades 68 rotate in the direction D, the BOAS 72 is forced to move circumferentially in the direction D. An outer portion 132 of the first curved recess 98 begins to travel on a radially outer portion 134 of the first retention member 130 in the direction D. The outer portion 132 of the first curved recess 98 traveling along the radially outer portion 134 of the first retention member 130 forces the BOAS 72 in a radially inward direction. This motion of the BOAS 72 can increase the wear between the BOAS 72 and the blade tip 68T or cause contact between the BOAS 72 and the blade tip 68T.

A BOAS mating component 136 is at least partially located in the recessed portion 110 of the BOAS 72 to aid in counteracting the tendency for the BOAS 72 to move circumferentially and be drawn toward the blade tip 68T. The BOAS mating component 136 includes a first circumferential end 138 that is received into the notch 118 and a radially extending projection or tab 142 mates with a recess 144 in the engine static structure 36 to accomplish the circumferential anti-rotation function. Alternatively, the tab 142 could be located on the engine static structure 36 and the recess 144 could be located in the BOAS mating component 136. The BOAS mating component 136 may be formed by casting, machining, or a combination of casting and machining. The first circumferential end 138 and the tab 142 may be formed by a machining process to closely control the tolerances between the two elements to control the amount of circumferential movement of the BOAS 72 allowed.

The first circumferential end 138 of the BOAS mating component 136 includes a crown at an interface with the flat portion of the circumferential end wall 126 of the notch 118. In one embodiment, the flat portion is flat within 0.010 of an inch (0.0254 cm). The crown on the first circumferential end 138 extends in a radial direction and avoids excessive stress on the circumferential end wall 126 that could damage or fracture the BOAS 72. In another embodiment, the circumferential end wall 126 could include a recess that mates with the crown in the BOAS first circumferential end 138. In a further embodiment, the circumferential end wall 126 of the notch 118 could include a crown and the first circumferential end 138 of the BOAS mating component 136 could be flat or include a recess that would mate with the crown on the circumferential end wall 126. In an example embodiment, the crown includes a radius of curvature of one inch (2.54 cm) to three inches (7.62 cm) and the circumferential end wall 126 includes a radius of curvature equal to or greater than the radius of curvature of the crown. A larger radius of curvature can require additional tooling and part inspection which can increase cost and manufacturing time.

A second circumferential end 140 of the BOAS mating component 136 engages the second circumferential end 117 of the recessed portion 110. A clearance or tolerance between the second circumferential end 140 of the BOAS mating component 136 and second circumferential end 117 of the recessed portion 110 on the BOAS 72 is not maintained as closely as the clearance/tolerance between of the first circumferential end 138 and the notch 118. The increased clearance between the second circumferential end 140 and the recessed portion 110 allows for thermal expansion of the BOAS mating component 136. In one embodiment, the BOAS mating component 136 includes a thermal expansion greater than the thermal expansion of the ceramic in the BOAS 72 and the BOAS mating component 136 is comprised of a metallic compound, such as nickel cobalt or another nickel based material.

The interaction of the radially extending tab 142 on the BOAS mating component 136 with the recess 144 in the engine static structure 36 and the interaction between the first circumferential end 138 and the notch 118 prevents the BOAS 72 from moving circumferentially during operation of the gas turbine engine 20. In one embodiment, the tab 142 extends between axial ends of the BOAS mating component 136. As the blade 68 causes the BOAS 72 to be drawn toward the blade tip 68T and the outer portion 132 travels along the radially outer portion 134 of the first retention member 130, the BOAS mating component 136 allows the BOAS 72 to move a predetermined amount. The predetermined amount will limit the circumferential movement of the BOAS 72 and therefore limit the radially inward movement of the first circumferential end 86 of the BOAS 72.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A seal arc segment comprising:
 a body including a radially inner surface and a radially outer surface, the radially inner surface and the radially outer surface are located between a first circumferential end and a second circumferential end;
 a recessed portion defining a cavity in the radially outer surface; and
 a notch located in an edge of the recessed portion adjacent the first circumferential end, wherein the notch includes a first circumferential end wall for engaging a mating component to prevent circumferential rotation of the body and the first circumferential wall includes a flat surface.

2. The seal arc segment of claim 1, including a first retention member adjacent the first circumferential end of the seal arc segment for engaging a mounting structure and a first recessed portion located radially inward from the first retention member.

3. The seal arc segment of claim 2, wherein the first recessed portion and the notch are formed by a machining process and the seal arc segment comprises a ceramic material.

4. The seal arc segment of claim 2, wherein the first recessed portion includes a curved surface extending between axial ends of the body.

5. The seal arc segment of claim 2, including a second retention member adjacent the second circumferential end of the seal arc segment for engaging the mounting structure and a curved surface extending between axial ends of the body.

6. The seal arc segment of claim 1, wherein the radially outer surface defines perimeter of the recessed portion.

7. A gas turbine engine comprising:
a rotor section including a rotor having a plurality of blades and at least one annular seal assembly circumscribing the rotor, the annular seal assembly comprising:
at least one seal arc segment including:
a body having a radially inner surface and a radially outer surface, the radially inner surface and the radially outer surface are located between a first circumferential end and a second circumferential end;
a recessed portion defining a cavity in the radially outer surface; and
a notch located in an edge of the recessed portion adjacent the first circumferential end; and
a mating component engaging the notch and an engine static structure.

8. The gas turbine engine of claim 7, including a first retention member adjacent the first circumferential end of the seal arc segment for engaging a mounting structure and a first recessed portion located radially inward from the first retention member.

9. The gas turbine engine of claim 8, wherein the first recessed portion and the notch are formed by a machining process.

10. The gas turbine engine of claim 9, wherein the seal arc segment comprises a ceramic material and the mating component comprises a metallic material.

11. The gas turbine engine of claim 10, wherein the first recessed portion includes a curved surface that extends between axial ends of the body.

12. The gas turbine engine of claim 7, wherein the mating component includes a tab that extends in a radial direction and an axial direction for engaging a recess in the engine static structure.

13. The gas turbine engine of claim 12, wherein the mating component includes a circumferentially extending portion having a first circumferential end for engaging the notch and a second circumferential end engaging a portion of the body.

14. The gas turbine engine of claim 13, wherein the notch includes a first circumferential end wall for engaging a mating component to prevent circumferential rotation of the body relative to the engine static structure.

15. The gas turbine engine of claim 14, wherein the first circumferential end of the mating component includes one of a crowned surface or a flat surface and the first circumferential wall of the notch includes the other of the crowned surface or the flat surface.

16. The gas turbine engine of claim 14, wherein the first circumferential end of the mating component includes a crowned surface and the first circumferential wall of the notch includes one of a flat surface or a recessed surface for engaging the crowned surface.

17. A method for maintaining positioning of a seal assembly, the method comprising:
locating a mating component in a recessed portion on a radially outer side of the seal arc segment;
mounting the seal arc segment to a mounting structure;
engaging a notch adjacent the recessed portion in the seal arc segment with a first circumferential end of the mating component; and
engaging at least one of a recess or a radially extending projection in an engine static structure with the other of the recess or the radially extending projection on the mating component.

18. The method of claim 17, including restricting circumferential movement of the seal arc segment while the mating component engaging the engine static structure and the seal arc segment.

19. The method of claim 17, wherein the seal arc segment includes a first retention member and a first recessed portion adjacent the first retention member, the first recessed portion and the notch formed in the seal arc segment by a machining process.

* * * * *